(12) United States Patent
Alkhatib

(10) Patent No.: US 9,753,982 B2
(45) Date of Patent: Sep. 5, 2017

(54) METHOD AND SYSTEM FOR FACILITATING LEARNING OF A PROGRAMMING LANGUAGE

(71) Applicant: Mazen Alkhatib, Mobile, AL (US)

(72) Inventor: Mazen Alkhatib, Mobile, AL (US)

( * ) Notice: Subject to any disclaimer, the term of this patent is extended or adjusted under 35 U.S.C. 154(b) by 0 days.

(21) Appl. No.: 14/886,958

(22) Filed: Oct. 19, 2015

(65) Prior Publication Data

US 2016/0110169 A1    Apr. 21, 2016

Related U.S. Application Data

(60) Provisional application No. 62/065,522, filed on Oct. 17, 2014.

(51) Int. Cl.
*G06F 9/44* (2006.01)
*G06F 17/30* (2006.01)

(52) U.S. Cl.
CPC .......... *G06F 17/30477* (2013.01); *G06F 8/31* (2013.01)

(58) Field of Classification Search
None
See application file for complete search history.

(56) References Cited

U.S. PATENT DOCUMENTS

| | | | |
|---|---|---|---|
| 2006/0143594 A1* | 6/2006 | Grimaldi | G06F 8/73 717/123 |
| 2007/0271282 A1* | 11/2007 | Boren | G06F 8/34 |
| 2008/0282108 A1* | 11/2008 | Jojic | G06F 8/436 714/26 |
| 2009/0293053 A1* | 11/2009 | Knatcher | G06F 8/61 717/175 |
| 2011/0099532 A1* | 4/2011 | Coldicott | G06F 8/10 717/105 |
| 2011/0302553 A1* | 12/2011 | Gulwani | G06F 9/44 717/107 |
| 2014/0201236 A1* | 7/2014 | Adler | G06F 8/71 707/769 |
| 2015/0082274 A1* | 3/2015 | Resig | G06F 8/34 717/109 |

* cited by examiner

*Primary Examiner* — Daxin Wu

(57) ABSTRACT

Disclosed is a method of facilitating learning a programming language. The method may include presenting, with a processor, a prompt to a user. Further, the method may include receiving, with a processor, an input representing a program behavior. Furthermore, the method may include generating, with a processor, a source code based on the input. Additionally, executing the source code may produce the program behavior.

2 Claims, 13 Drawing Sheets

METHOD AND SYSTEM FOR FACILITATING LEARNING OF A PROGRAMMING LANGUAGE

CROSS REFERENCE TO RELATED APPLICATIONS

The present application claims priority to U.S. Provisional Patent Application No. 62/065,522, filed Oct. 17, 2014, entitled "Smart Programming Education via Reverse Learning (SPERL)", the disclosure of which is incorporated herein by reference in its entirety. The present application is filed on Oct. 19, 2015 while Oct. 17, 2015 was on a weekend.

FIELD

The present disclosure relates to the field of learning. More specifically, the present disclosure relates to methods and systems for facilitating learning of a programming language using a reverse learning methodology.

BACKGROUND

With the increasing use of computers in modern world, there is an increasing demand for software developers. Accordingly, users who wish to develop software are required to learn programming languages. Further, there is a wide range of programming languages available with different features tailored to suit different applications. Therefore, even a software professional who may be knowledgeable about some programming languages may be required to learn a new programming language specifically tailored for certain applications.

However, learning a programming language is often a challenging task. There are several learning tools currently available that attempt to make the learning process effective. However, the currently available learning tools follow a traditional methodology of requiring users to first learn the syntax and programming constructs of the programming language along with code examples. Subsequently, the users may be presented with exercises that require the users to write code to achieve a given objective. Consequently, the users spend significant amount of time familiarizing with the syntax and programming constructs before being able to practice writing code. As a result, the learning cycle of these learning tools is considerably longer.

Accordingly, there is a need for learning tools that can facilitate learning of a programming language by allowing users to practice writing code earlier in the learning cycle.

SUMMARY

Disclosed is a method of facilitating learning of a programming language in accordance with various embodiments. The method may include presenting, with a processor, a prompt to a user. Further, the method may include receiving, with a processor, an input representing a program behavior. Additionally, the method may include generating, with a processor, a source code based on the input. Further, execution of the source code may correspond to the program behavior.

Also disclosed is system for facilitating learning of a programming language in accordance with various embodiments. The system may include each of a processor, a database and a network interface module. The database may include source code indexed according to program behavior. Further, the processor may be configured to receive, using the network interface module, a query comprising an input representing a program behavior. Additionally, the processor may be configured to execute the query on the database to retrieve source code corresponding to the program behavior. Furthermore, the processor may be configured to transmit, using the network interface module, the source code retrieved from the database.

Further disclosed is a system for facilitating learning of a programming language in accordance with various embodiments. The system may include each of a processor, a storage module and a network interface module. Further, the processor may be configured to present, using the network interface module, a prompt to a user. Additionally, the processor may be configured to receive, using the network interface module, an input representing a program behavior. Furthermore, the processor may be configured to generate a source code based on the input, wherein execution of the source code corresponds to the program behavior.

DETAILED DESCRIPTION

Overview:

The present disclosure relates to methods and systems for facilitating learning of a computer programming language. Techniques described herein are based on a pedagogical methodology called as "Reverse Learning". Traditional methods of learning a programming language require users to first familiarize with the syntax of the programming language. In contrast, according to the Reverse Learning technique of the present disclosure, users may describe a program behavior corresponding to code that they wish to develop and learn the programming language by studying an automatically generated source code that may produce the program behavior.

For instance, a user may describe the program behavior to indicate how the program, when executed, may interact with a user. Similarly, in another instance, the user may describe how the program may process an input provided by a user. Likewise, in yet another instance, the user may describe how the program may present an output to a user.

Accordingly, based on the program behavior described by the user, a source code may be automatically generated. In an instance, the source code may be generated by retrieving the source code from a source code repository indexed according to program behavior. In other words, the source code repository may include snippets of code corresponding to different program behaviors. Accordingly, one or more code snippets constituting the source code may be retrieved by executing a query on the source code repository.

Subsequently, the source code may be presented to the user. As a result, the user may be able to study the source code and develop an understanding of the programming language.

Figure 10:
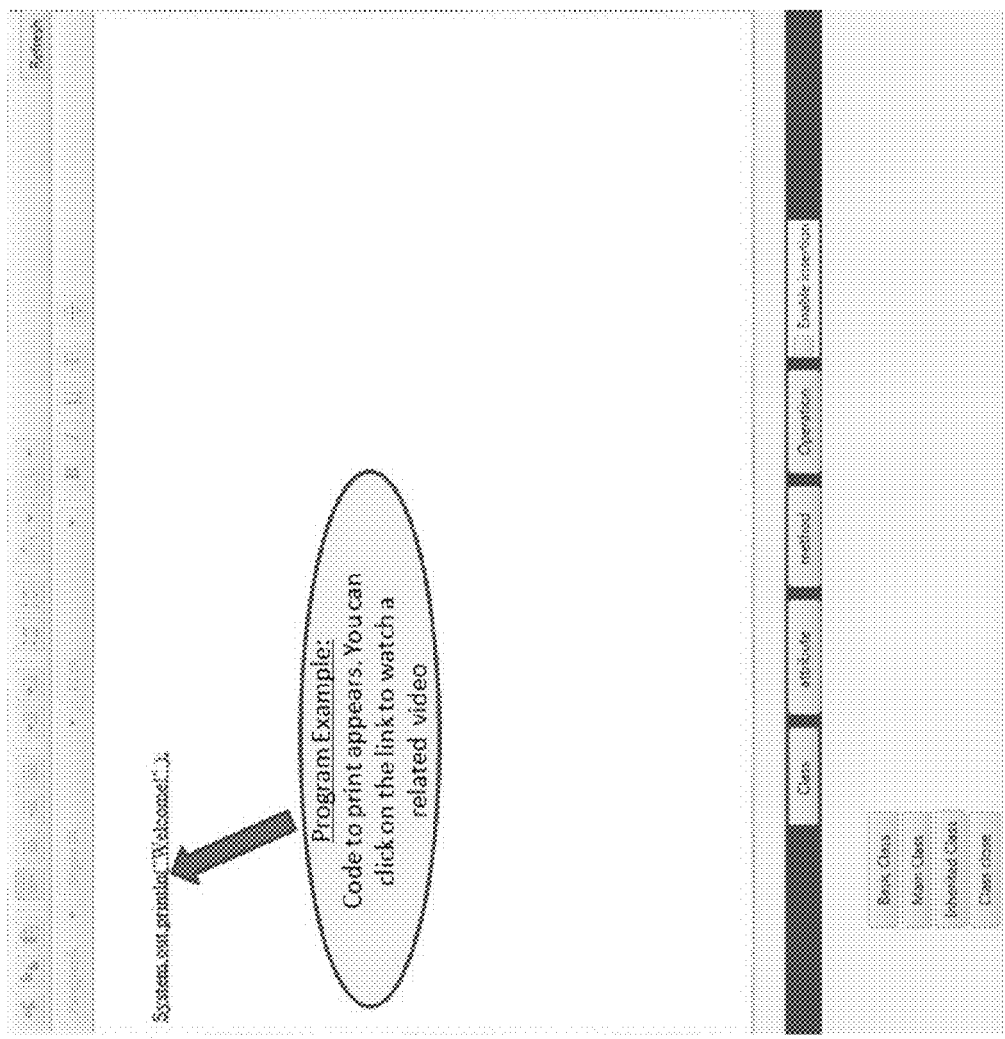
FIG. 10 illustrates a GUI of a learning tool displaying a source code for facilitating learning of a programming language according to various embodiments.

Further, the user may be enabled to select a portion of the source code of interest. For example, the user may be enabled to click on a portion of the source code using a pointing device such as a mouse. Accordingly, an educational content corresponding to the portion of the source code may be identified and presented. For example, as exemplarily illustrated in FIG. 10, clicking on the portion of the source code may display a video of the educational content. In an instance, a database including educational content indexed according to programming constructs may be queried based on the portion of the source code selected by the user. Accordingly, the education content in the form of text, video, audio or multimedia may be retrieved and presented to the user. As a result, the user may gain an improved understanding of the programming language.

Additionally, the user may be enabled to execute the source code and observe a result of the execution. Any errors identified in the source code may then be displayed to the user. Accordingly, the user may be enabled to make changes to the source code in order to eliminate the errors. As a result, the user may learn a valid usage of programming constructs of the programming language.

Furthermore, the user may be presented with an option to replace an erroneous portion of source code with a valid code snippet that may be equivalent to the erroneous portion. In order to do so, a database including valid code snippets may be queried based on the erroneous portion of source code. In an instance, the database may index the valid code snippets based on corresponding program behavior. Accordingly, once the valid code snippet is identified, the erroneous portion may be replaced with the valid code snippet. As a result, the user may be able to learn further about the programming language by studying the valid code snippet.

Figure 1:
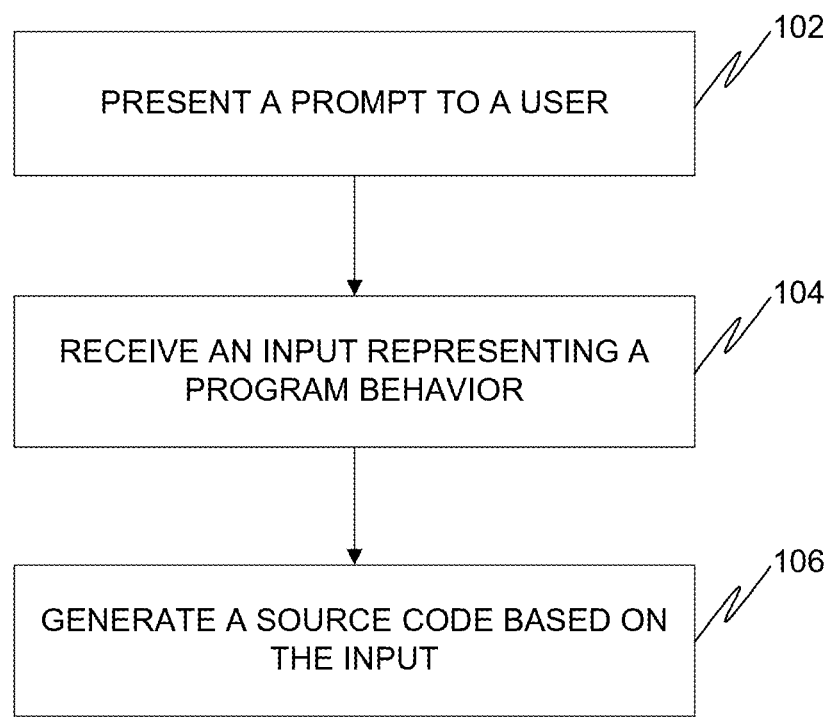
FIG. 1 illustrates a flow chart of a method of facilitating learning of a programming language in accordance with various embodiments.

FIG. 1 illustrates a flow chart of a method of facilitating learning of a programming language according to various embodiments. In various embodiments, the method may be instantiated as a computer implemented method. The term "computer implemented method" is to be understood to mean a method that may be performed at least in part by a computer. For example, in various embodiments, one or more steps of the method may be performed by a hardware element such as a processor. Further, in various embodiments, the method may be implemented in the form of a learning tool configured to be executed by a processor.

The programming language may in general be a language in which instructions are provided by a user to a computer in order to perform an operation. In an instance, the instructions may correspond to specific steps of an algorithm. In an embodiment, the programming language may be based on textual form. For example, alphanumeric tokens may be used to express the instructions. In another embodiment, the programming language may be based on pictograms. For example, predefined pictograms may be used to express the instructions. Examples of the programming language include, but are not limited to, Java, Python, C, C++, C#, objective-C, Ruby, SQL, JavaScript, PHP, CSS and HTML.

Learning of the programming language may involve one or more of understanding of the primitives of the programming language, syntax to be followed while expressing an instruction using the primitives and a style guide to be followed while writing a program. For example, learning a programming language such as Python may include gaining an understanding of mathematical operators such as, '+', '−', '=', '*', '**', '/' and '//' etc. and built-in functions such as 'list( )', 'set( )', 'dict( )' etc. Further, learning Python may also include gaining knowledge of the reserved words that may not be used as variable names. Furthermore, learning Python may include understanding of rules such as "enclosing string constants with either single quotes or double quotes while assigning values to a string variable". Similarly, learning Python may include gaining knowledge of style guidelines such as "limiting the number of characters on a line of the source code to 79".

According to various embodiments, at a step 102, a prompt may be presented, using a processor, to a user. Presenting the prompt in general may be performed using one or more presentation devices. In various embodiments, the prompt may be presented by the learning tool that is configured to perform one or more steps of the method. Examples of presentation devices include, but are not limited to, display device, speaker, Braille display etc.

In general, the prompt may be any information that elicits the user to provide an input. For instance, the prompt may be a message informing the user that a system executing the method may be ready to accept an input from the user. In another instance, the prompt may be information that suggests the user to provide an input. In some instances, the prompt may be a general message such as "Please enter a description of the program behavior". In some other instances, the prompt may be a specific message such as "Please enter the output to be displayed by the program". In some other instances, the prompt may be a question. Further, in various embodiments, the question may be related to the program behavior. For example, the question such as, "Does the program you wish to develop involve mathematical operations?", may be presented to the user. As another example, the question such as, "What input should be received from a user of the program?" or "What output should be displayed to a user of the program?" may be presented.

Alternatively, in other instances, the prompt may include a representation of a collection of program behaviors. The representation may be based on the modality through which the presentation is performed. For instance, if the presenting is performed by displaying, graphical representations corresponding to the collection of program behaviors may be displayed to the user. Similarly, if the presenting is performed by playing an audio on a speaker, aural representations corresponding to the collection of program behaviors may be played to the user. Further, the prompt may include either an implicit indication or an explicit indication to select one or more program behaviors from the collection of program behaviors presented to the user.

Subsequently, at step 104, an input representing a program behavior may be received, using a processor, from the user. The input may be received via one or more input devices. In various embodiments, the input may be received through a touch sensitive display device configured for both presenting the prompt and also receiving the input in the form of touch. Examples of the one or more input devices include keyboard, mouse, stylus, touch pad, touch sensitive screen, voice recognition devices and gesture recognition devices.

The program behavior may include one or more of an input behavior, an output behavior and a processing behavior. In various embodiments, the input may include a textual description of the program behavior. For instance, the input may include a natural language description of the program behavior such as, for example, "My program would ask the user to enter any two numbers and print the sum and product of the two numbers". As another instance, the input may include a structured textual description of the program behavior according to a standard format. Accordingly, a template based on the standard format may be presented to the user. For example, the standard format may include a first field corresponding to the input behavior, a second field corresponding to the output behavior and a third field corresponding to the processing behavior. Moreover, in some instances, the standard format may include further fields corresponding to specific behaviors such as "Conditions to be tested" and "Actions to be taken based on result of testing the conditions". In some other embodiments, the input may include an answer to the question asked in the prompt. For instance, the answer may represent one of confirmation such as, for example, "YES" and negation, such as, for example, "NO". For illustration purposes, consider the question included in the prompt: "Does the program you wish to develop involve mathematical operations". Accordingly, if the user intends to develop a program that does not involve mathematical operations, the user may provide "NO" as the answer to the question.

Thereafter, at step 106, a source code may be generated, with a processor, based on the input received from the user. In general, execution of the source code may correspond to the program behavior.

In various embodiments, the source code may be such that execution of the source code may produce the program behavior represented by the input. For example, if the program behavior specified by the user includes "accepting an input string and displaying the input string", the source code generated may be such that it is configured to receive an input string into a string variable and subsequently display the input string by posting the value of the string variable to the console.

In other embodiments, the source code may be such that execution of the source code may partially produce the program behavior represented by the input. In other words, in some instances, the source code may be such that execution of the source code may produce an approximation of the program behavior represented by the input.

In some further embodiments, the source code may be such that execution of the source code may result in one or more errors. For instance, the source code may be missing one or more lines of code. As another instance, the source code may include one or more of a syntactic error and a logical error. Subsequently, the user may be elicited to identify and eliminate the one or more errors. Further, the source code may be such that upon elimination of the one or more errors, execution of the source code may produce the program behavior represented by the input.

Subsequently, in various embodiments, the source code may be presented to the user. For example, the source code may be displayed to the user within a GUI of the learning tool. As a result, the user may be enabled to study the source code and obtain an understanding of the programming language. For instance, the user may observe how the description of the program behavior provided by the user is embodied in the programming constructs and control flow of the source code. Consequently, the user may be able to learn one or more aspects of the programming language, such as, but not limited to, valid primitives of the programming language, reserved words of the programming language, rules to be followed in writing instructions and so on.

Furthermore, in some other embodiments, the user may be enabled to execute the source code. For instance, the learning tool may include an built-in compiler to facilitate compilation of the source code. Further, the user may be enabled to provide one or more observation inputs based on execution of the source code. In general, the one or more observation inputs may represent program behavior of the executed source code. In other words, the user may be enabled to provide a feedback with regard to the user's observations of how the source code executed. In various embodiments, the prompt may be presented to the user in order to elicit the input including the one or more observation inputs. Further, in some other embodiments, the prompt may further be based on the one or more observation inputs. For instance, subsequent to receiving the one or more observation inputs, the prompt may be displayed requesting for further specification of the program behavior from the user.

Figure 2:
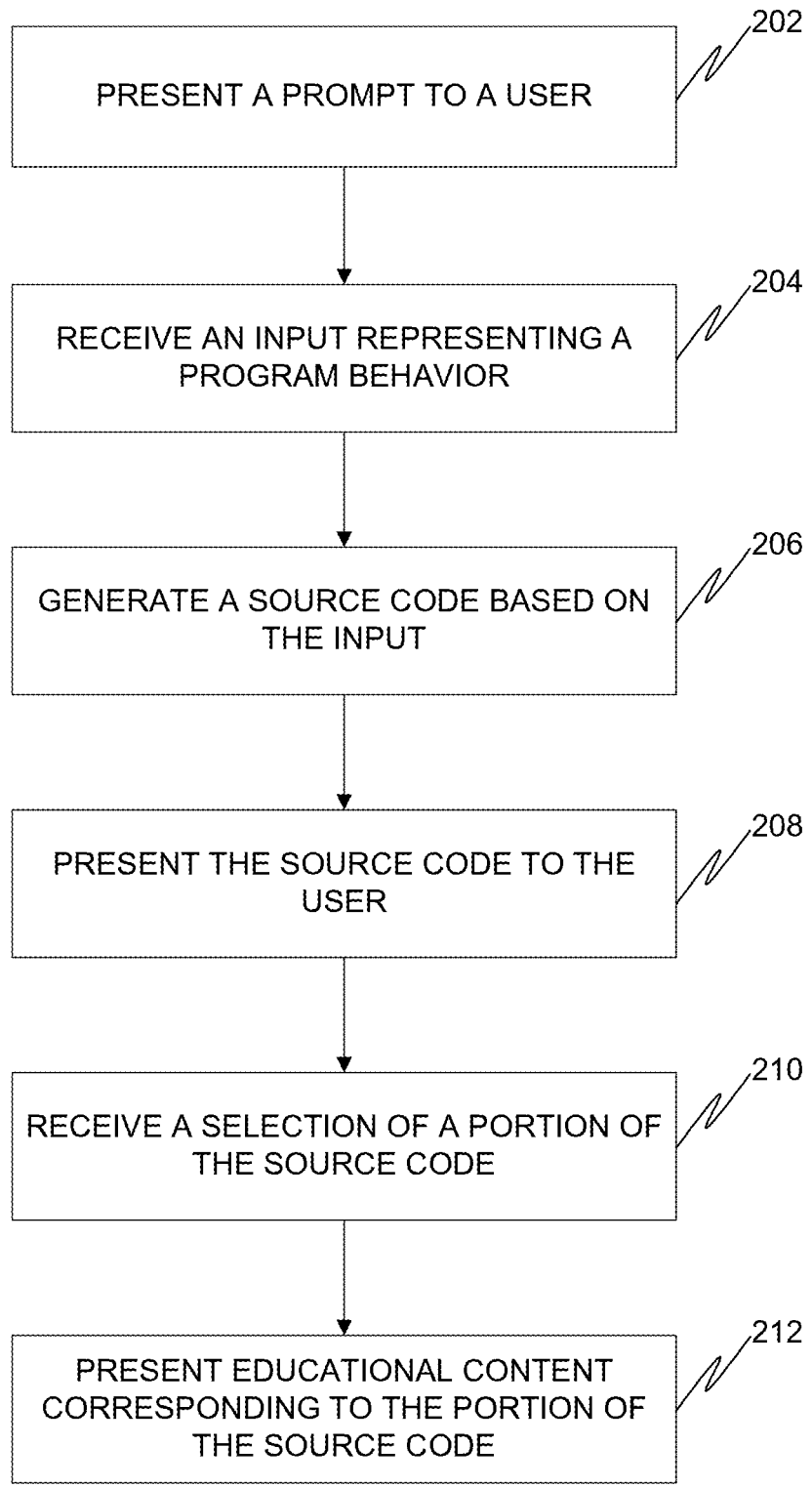
FIG. 2 illustrates a flow chart of a method of facilitating learning of a programming language in accordance with various embodiments.

Turning now to FIG. 2, a flow chart of a method of facilitating learning of a programming language according to various embodiments is shown. At step 202, the prompt may be presented, using a processor, to the user. For instance, the prompt may include a display of different program behaviors such as "Print", "Loop", "Message" etc. in the form of GUI buttons as illustrated exemplarily in FIG. 9. Accordingly, the user may be elicited to indicate one or more of the program behaviors. For example, the user may be elicited to click on one of the GUI buttons representing a program behavior of choice.

Figure 9:
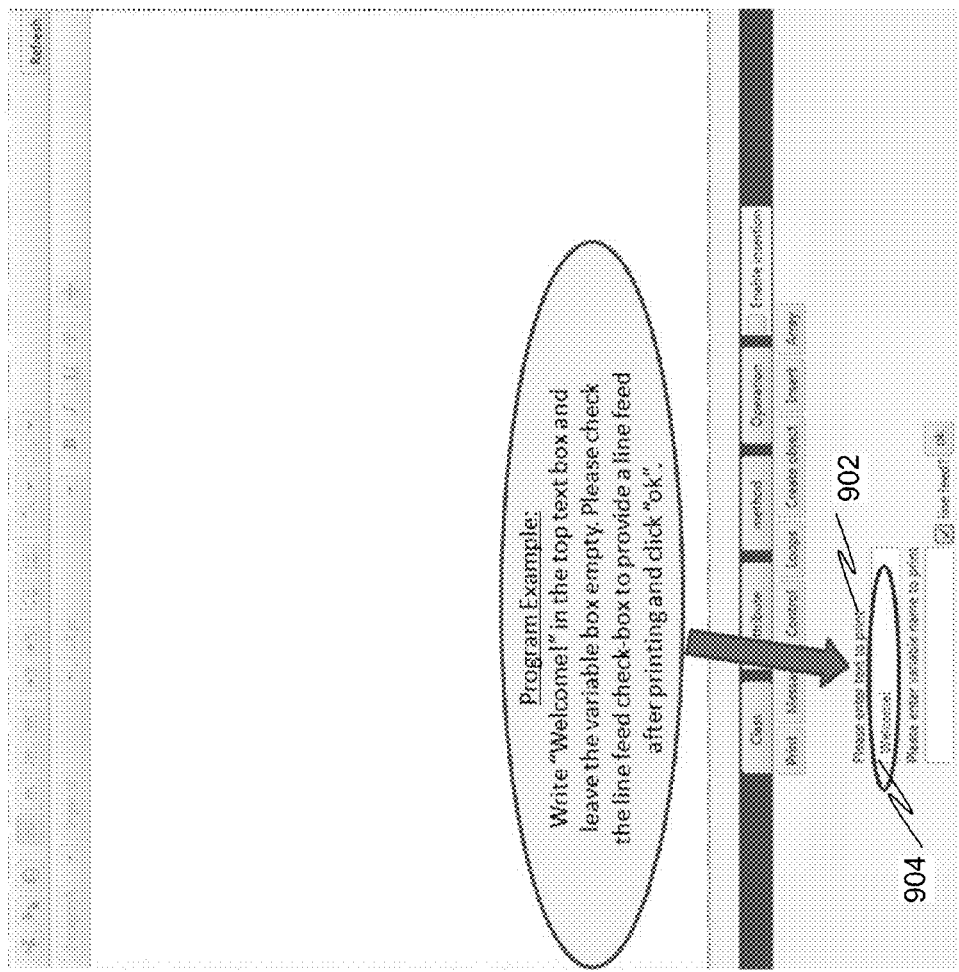
FIG. 9 illustrates a GUI of a learning tool displaying a prompt for facilitating learning of a programming language according to various embodiments.

Further, at step 204, the input may be received, using a processor, from the user. For instance, as exemplarily illustrated in FIG. 9, subsequent to the user selecting the program behavior of "Print", the prompt 902 of "Please enter text to print" may be displayed to the user as shown in FIG. 9. Accordingly, the user may be enabled to provide the input. For instance, the user may be presented with a GUI element 904 such as a text box in order to receive the input.

Thereafter, at step 206, the source code may be automatically generated based on the input. Further, at step 208, the source code may be presented to the user. For instance, the source code may be displayed to the user within a GUI of the learning tool as exemplarily illustrated in FIG. 11. Additional details regarding steps 202 to 206 may be understood from description of corresponding steps 102 to 106 of FIG. 1.

Subsequently, at step 210, a selection of a portion of the source code may received, using a processor, from the user. Further, the selection may be received through one or more input devices. For example, the user may be enabled to highlight the portion of the source code using a pointing device such as a mouse. In some other embodiments, the user may be enabled to select the portion by hovering a mouse cursor near the portion of the source code. Alternatively, in some other embodiments, the user may be enabled to touch a corresponding part of a touch sensitive display screen displaying the source code.

Figure 8:
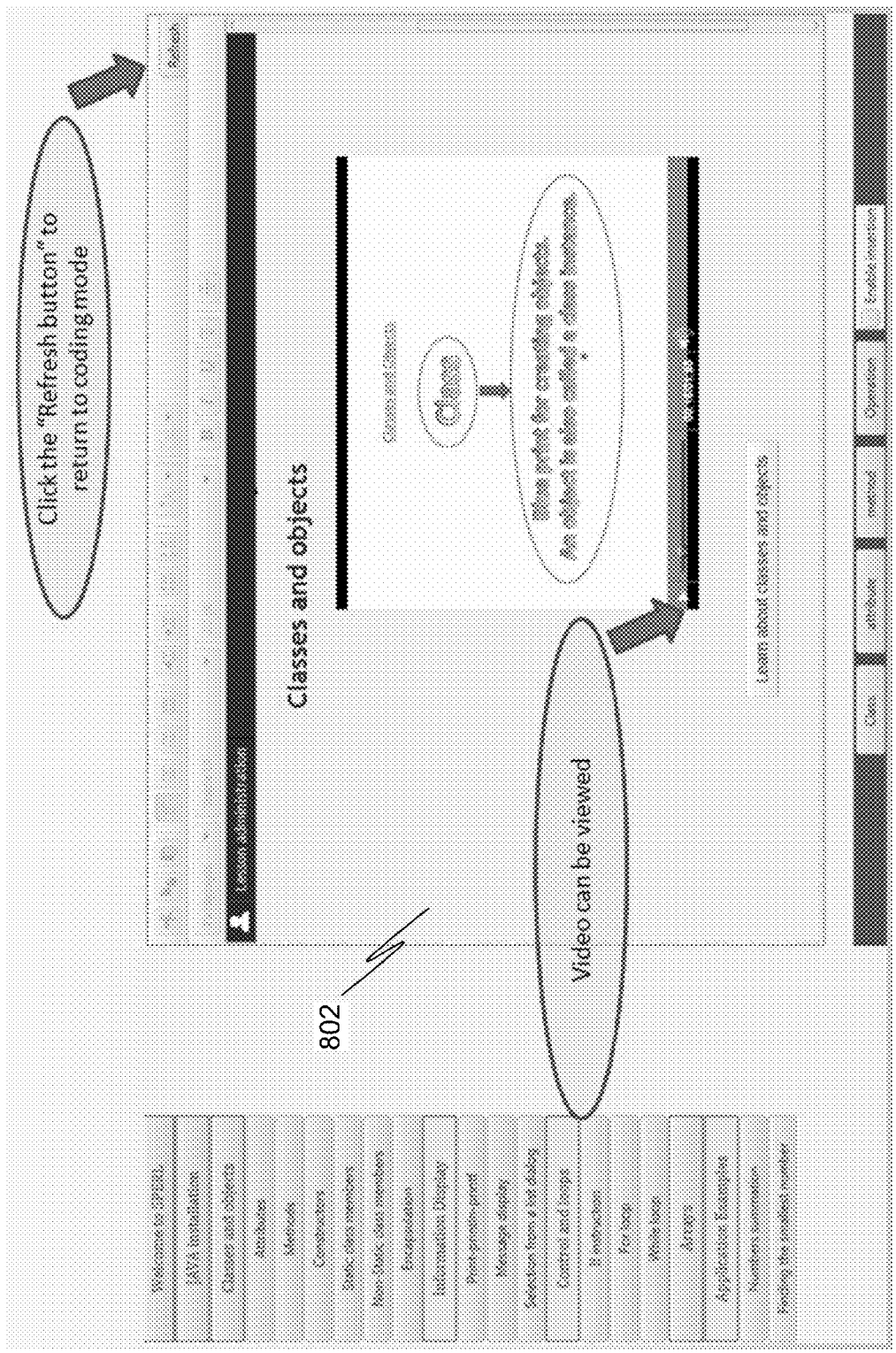
FIG. 8 illustrates a GUI of a learning tool displaying an educational content for facilitating learning of a programming language according to various embodiments.

Further, based on the portion of the source code selected, at step 212, an educational content corresponding to at least the portion of the source code may be presented to the user. In various embodiments, the educational content may be presented in one or more forms such as, but not limited to, text, audio, video and multimedia. Accordingly, presenting of the educational content may be performed on corresponding one or more presentation devices. For instance, the educational content in the form of a video may be displayed with the GUI of the learning tool as exemplarily illustrated in FIG. 8. As shown, a video about programming construct of class and object may be displayed to the user.

In general, the educational content may be any information that may facilitate the user in learning to write code using the programming language. For instance, the educational content may relate to the programming language. In another instance, the educational content may relate to general algorithmic techniques. In yet another instance, the educational content may relate to general best practices to be followed while writing code.

In various embodiments, the educational content may include information specific to the portion of the source code. For instance, the information may include an explanation of logic embodied in the portion of the source code or code surrounding the portion. As another instance, the information may include description of programming constructs used in the portion of the source code or code surrounding the portion. Further, the description may include definitions, uses cases and best practices.

Figure 3:
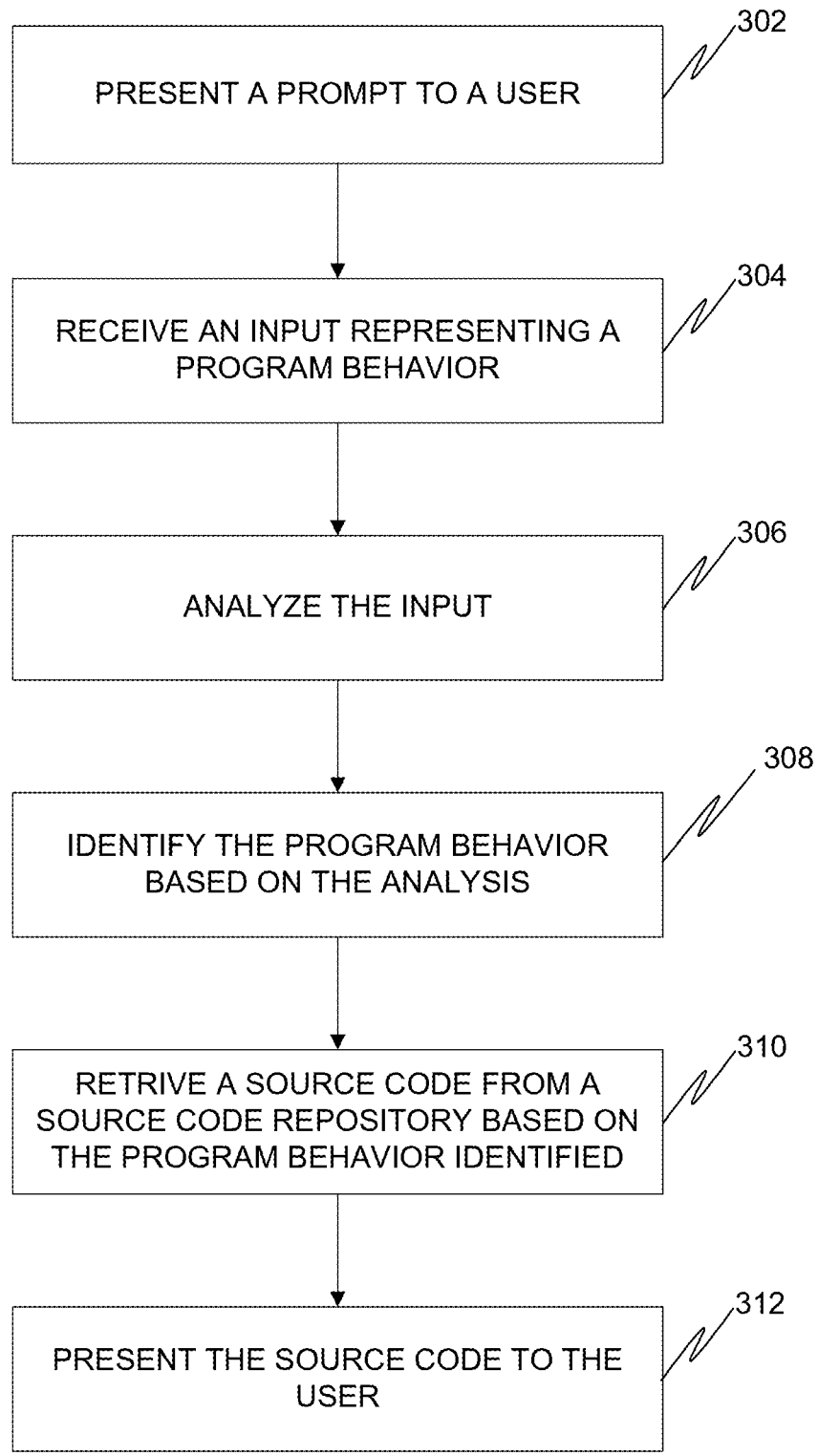
FIG. 3 illustrates a flow chart of a method of facilitating learning of a programming language in accordance with various embodiments.

Moving on to FIG. 3, a method of facilitating learning of a programming language according to various embodiments is shown. At step 302, the prompt may be presented, using a processor, to the user. For example, the prompt including a message such as "Please enter a description of the output to be generated by your program" may be displayed to the user on a display device. Subsequently, at step 304, the input representing the program behavior may be received, using a processor, from the user.

For example, the user may respond to the prompt by providing the input such as "Displaying sum of two numbers". Thereafter, at step 306, the input may be analyzed, using a processor. In various embodiments, the analysis may include natural language processing techniques to process the input including natural language description of the program behavior. In some other embodiments, the analysis may include identification of predetermined parameter-value pairs corresponding to the program behavior included in the input. For instance, the input such as "Accept two numbers and print sum" may be analyzed to identify a parameter-value pair of "print-sum".

In various embodiments, based on the analysis of the input, a further prompt may be presented to the user. For instance, consider a first prompt presented at step 302 to be "Does your program involve mathematical operations?". Further, consider a first input provided by the user at step 304 to be "YES". Accordingly, a second prompt may be generated based on the first input. For example, the second prompt may be generated and presented to the user such as "Please enter the name of the mathematical operation".

Subsequently, a second input, such as, for example, "Multiplication", may be received from the user as a response to the second prompt.

Subsequently, at step 308, based on the analysis of the input, the program behavior intended by the user may be identified. For example, based on the input, the program behavior may be identified to include each of the input behavior of accepting two numbers, the processing behavior of multiplying the two numbers and the output behavior of displaying the product of the two numbers on a display device.

Thereafter, at step 310, the source code may be retrieved from a source code repository based on the program behavior identified. Accordingly, the source code repository may be indexed according to program behaviors. For instance, the source code repository may include code snippets tagged with program behavior indicators corresponding to one or more of input behavior, processing behavior and output behavior. For instance, a code snippet may be tagged with parameter-value pairs corresponding to program behaviors such as "input-numbers", "operation-multiplication" and "output-(display, product)". Accordingly, in various embodiments, a query based on the input may be executed on the source code repository to retrieve the source code.

For example, the query may be formed from one or more keywords extracted from the input, such as, for instance, "numbers", "print" and "product" from the input "Accept two numbers and print their product".

Figure 11:
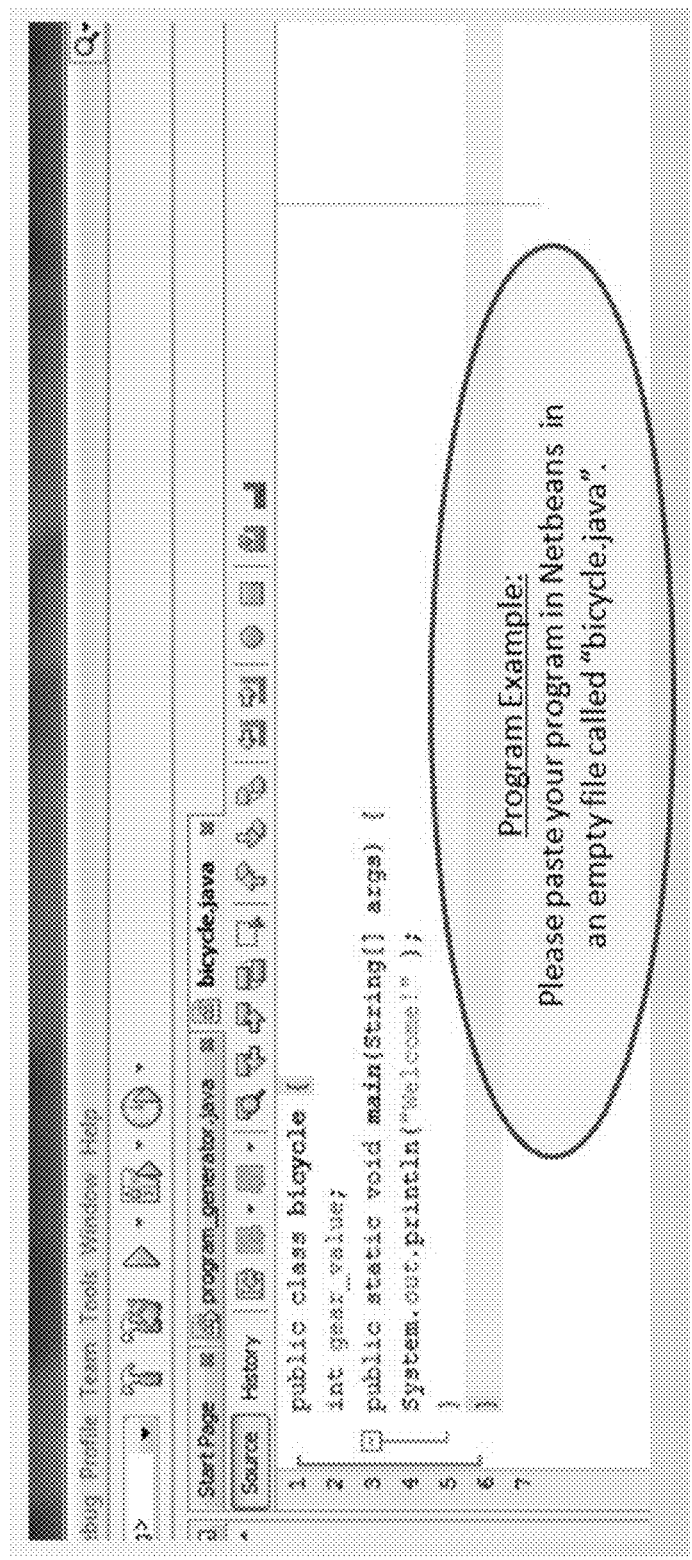
FIG. 11 illustrates a GUI of a learning tool displaying a source code for facilitating learning of a programming language according to various embodiments.

Subsequently, at step 312, the source code may be presented to the user, for example, by displaying the source code on a display device as shown in FIG. 11. As a result, the user may be able to study the source code and gain an understanding of one or more aspects of the programming language.

Figure 4:
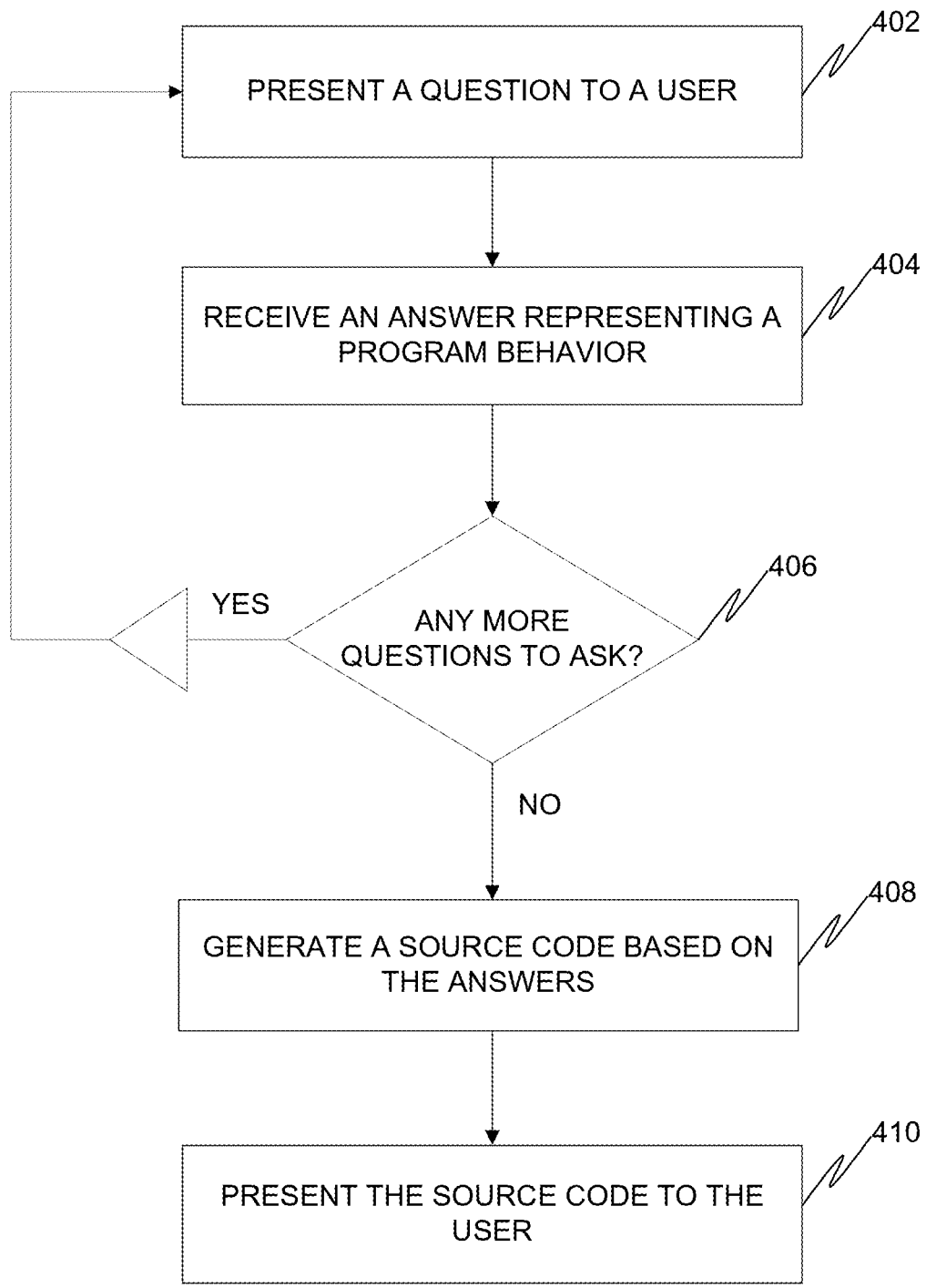
FIG. 4 illustrates a flow chart of a method of facilitating learning of a programming language in accordance with various embodiments.

FIG. 4 illustrates a method of facilitating learning of a programming language in accordance with various embodiments. At step, 402, the prompt in the form of a question may be presented to the user. The question may be, for example, "Does your program involve accepting inputs from users?" Accordingly, at step 404, the input in the form of an answer to the question may be received. For example, the answer provided by the user may be "YES". Accordingly, at step 406, the prompt in the form of another question may be presented to the user. The prompt may correspond to a confirmation for terminating presentation of a further prompt to the user. For example, the prompt may be "Do you have any further specification of the program behavior?". Subsequently, the input from the user in the form of a second answer may be received. The input may represent one of confirmation and negation. In an instance, if the second answer is "YES", the prompt in the form of a third question may be presented to the user in order to obtain further information regarding the program behavior. In another instance, if the second answer is "NO", the method proceeds to step 408 at which, the source code is automatically generated based on one or more answers provided by the user in response to corresponding one or more questions presented. Thereafter, at step 410, the source code may be presented to the user.

Figure 5:
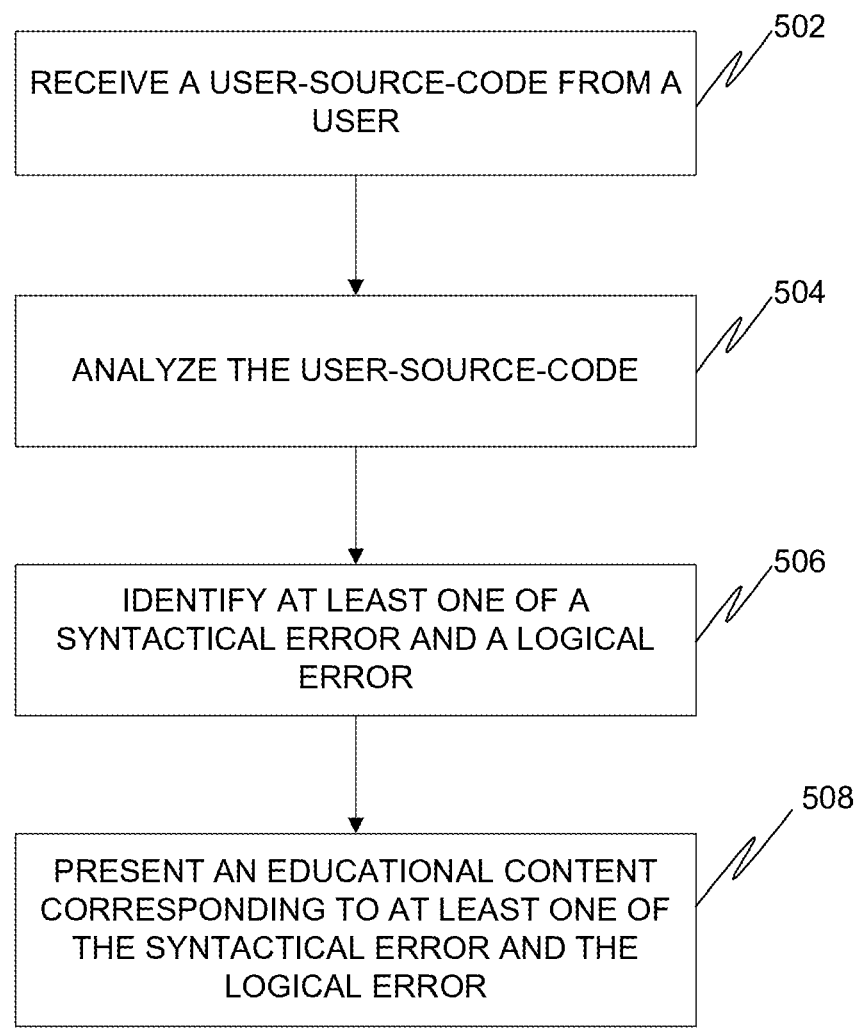
FIG. 5 illustrates a flow chart of a method of facilitating learning of a programming language in accordance with various embodiments.

FIG. 5 illustrates a method of facilitating learning of a programming language in accordance with various embodiments. At step 502, a user-source-code may be received from the user. The user-source-code may be a code written by the user. Alternatively, the user-source-code may be at least a portion of the source code automatically generated as described earlier. Subsequently, at step 504, the user-source-code may be analyzed. Such analysis may include one or more of static analysis and run-time analysis. Thereafter, at step 506, one or more of a syntactical error and a logical error may be identified based on the analysis. Subsequently, the educational content corresponding to one or more of the syntactical error and the logical error may be retrieved and presented to the user at step 508. As a result, the user may gain an improved understanding of reasons for errors in the user-source-code and ways to eliminate the errors.

Figure 6:
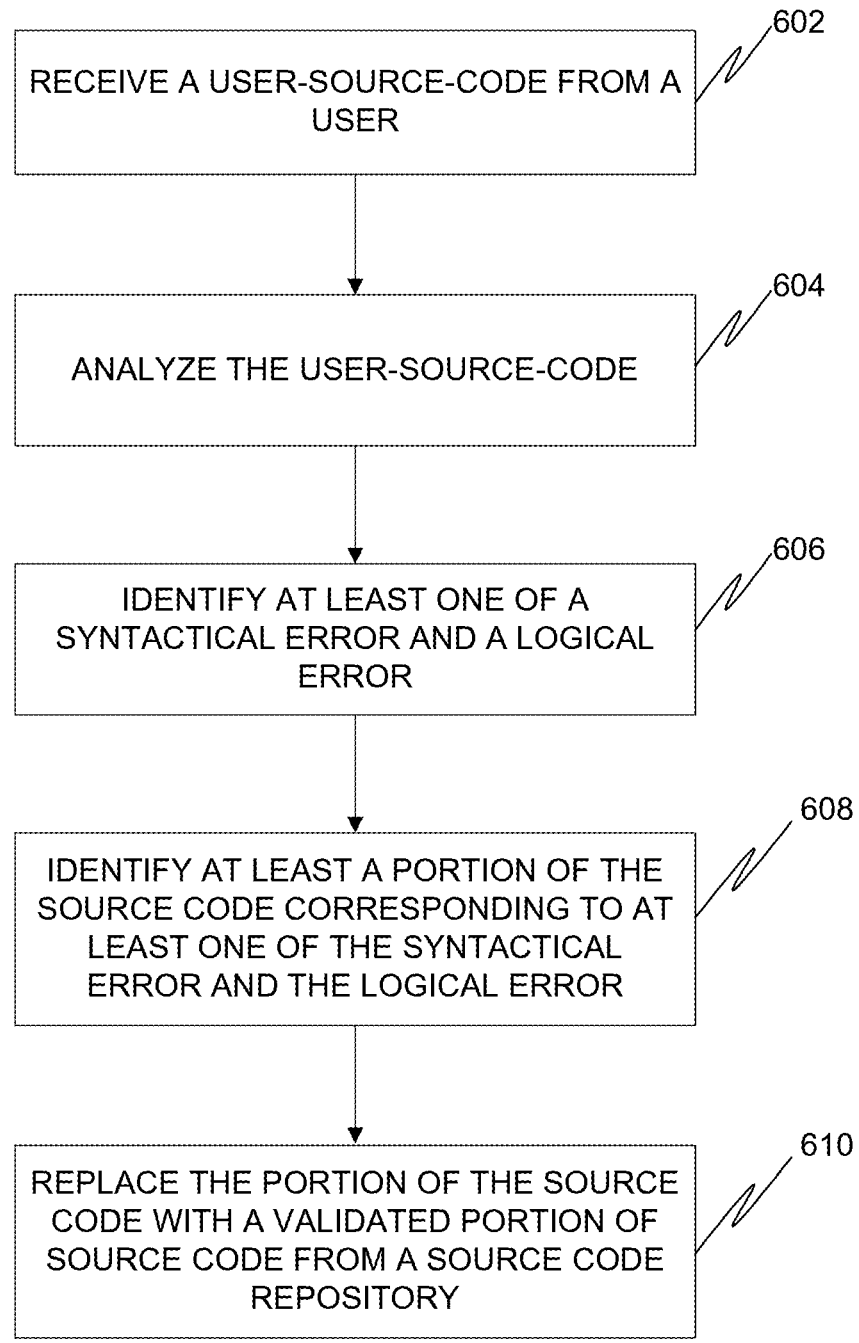
FIG. 6 illustrates a flow chart of a method of facilitating learning of a programming language in accordance with various embodiments.

FIG. 6 illustrates a method of facilitating learning of a programming language in accordance with various embodiments. At step 602, a user-source-code may be received from the user. The user-source-code may be a code written by the user. Alternatively, the user-source-code may be at least a portion of the source code automatically generated as described earlier. Subsequently, at step 604, the user-source-code may be analyzed. Such analysis may include one or more of static analysis and run-time analysis. Thereafter, at step 606, one or more of a syntactical error and a logical error may be identified based on the analysis. Subsequently, at step 608, a portion of the source code corresponding to one or more of the syntactical error and the logical error may be identified. For example, a line of code including the one or more of the syntactical error and the logical error may be identified. Thereafter, at step 610, the portion of the source code may be replaced with a validated portion of source code retrieved from the source code repository. Additionally, in various embodiments, the educational content corresponding to one or more of the syntactical error and the logical error may also be presented to the user. As a result, the user may be able to learn about errors present in the user-source-code and how to correct the errors.

Figure 7:
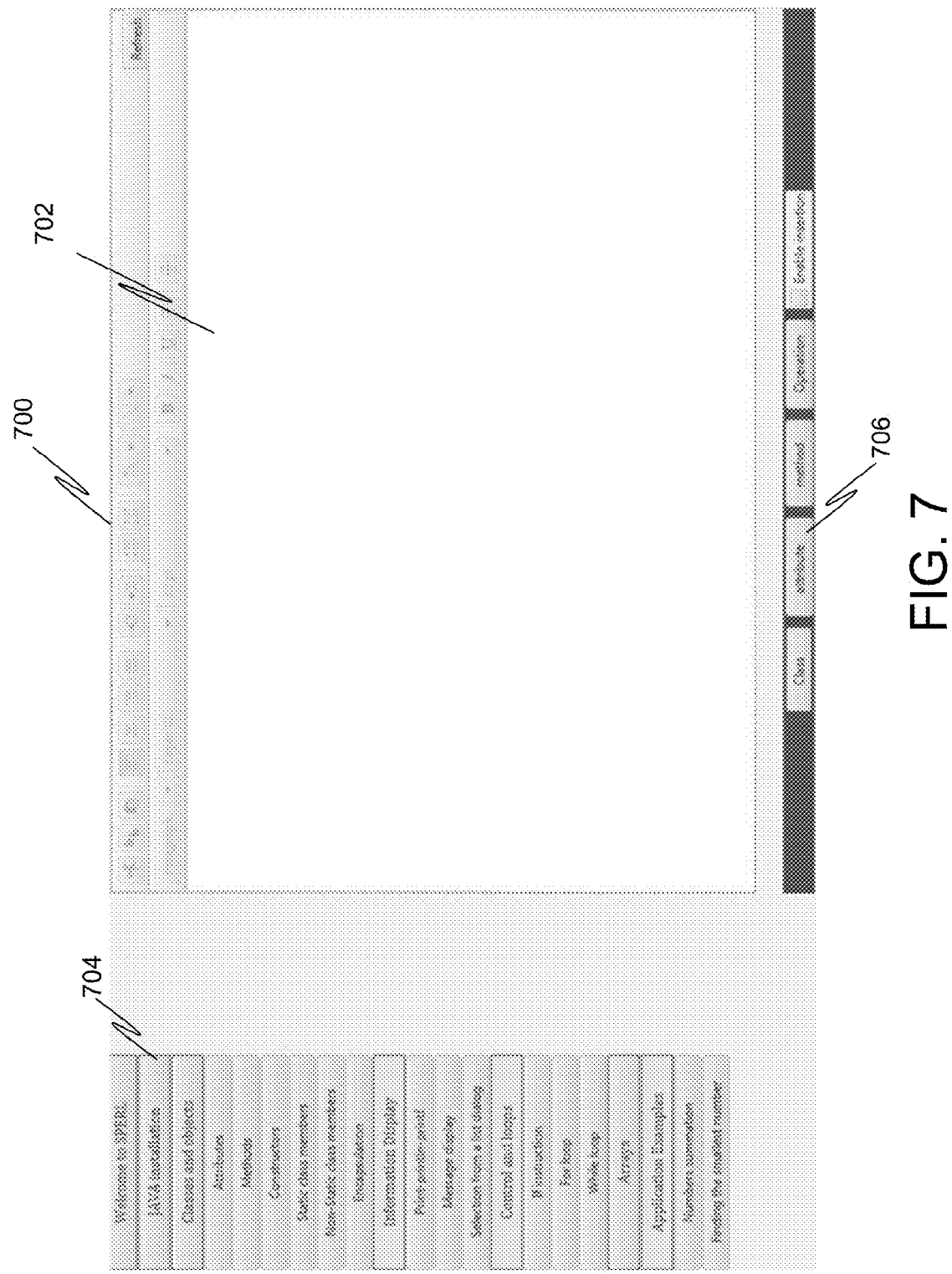
FIG. 7 illustrates a GUI of a learning tool for facilitating learning of a programming language according to various embodiments.

FIG. 7 illustrates a GUI 700 of the learning tool for facilitating learning of the programming language according to various embodiments. As shown, the GUI 700 may include a workspace region 702 configured for receiving textual input from the user. Further, in various embodiments, the workspace region 702 may also be configured for displaying the educational content. Further, the GUI 700 includes menu items 704 corresponding to different programming constructs of the programming language. Accordingly, the user may select a programming construct of interest. Furthermore, the GUI 700 may include buttons 706 representing the collection of program behaviors.

Accordingly, the user may select a program behavior of choice by clicking one of the buttons 706. Subsequently, the user may be presented with the prompt one or more times as described earlier in conjunction with FIG. 1 to FIG. 6.

Figure 12:
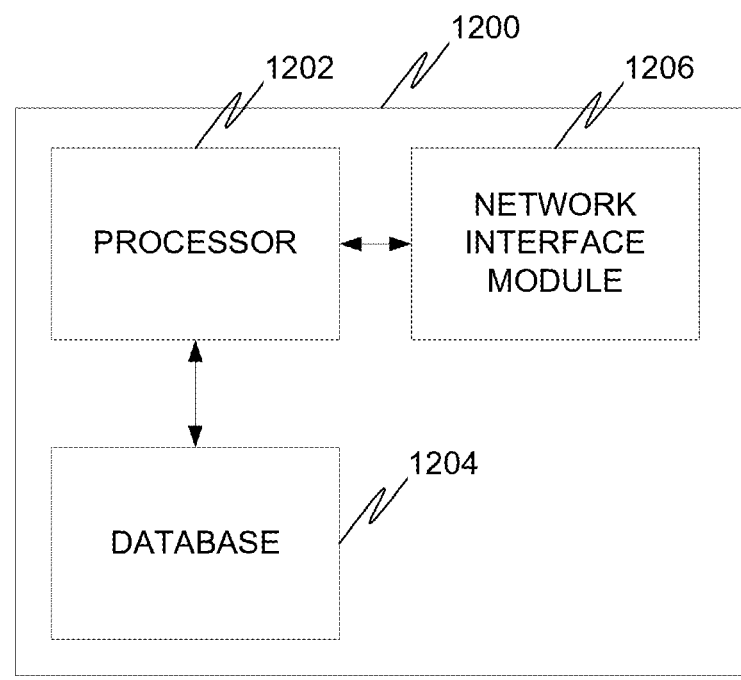
FIG. 12 illustrates a system for facilitating learning of a programming language according to various embodiments.

FIG. 12 illustrates a system 1200 for facilitating learning of the programming language according to various embodiments. The system 1200 may include each of a processor 1202, a database 1204 and a network interface module 1206. The database may include source code indexed according to program behavior.

Further, the processor may be configured to receive, using the network interface module 1206, a query comprising the input representing the program behavior. For instance, the user may be using a user device such as, for example, a laptop computer, in order to learn the programming language in accordance with methods and systems disclosed herein. Accordingly, the system may be configured to communicate with the user device over a communication channel such as, for example, the internet. The network interface module 1206 included in the system may accordingly provide an interface between the system 1200 and the user device.

Further, the processor 1202 may be configured to execute the query on the database 1204 to retrieve the source code corresponding to the program behavior. Examples of database 1204 include, but are not limited to, SQL Server, Oracle Database, Sybase, Informix, and MySQL. Further, in various embodiments, the database 1204 may further include educational content indexed according to one or more of a program behavior and at least a portion of the source code. In other words, the education content may be stored in the database 1204 in such a way that the educational content may be retrieved either based on corresponding program behavior or portions of corresponding source code.

Further, the processor 1202 may be configured to identify the educational content based on one or more of the program behavior and at least a portion of the source code. Additionally, the processor 1202 may be configured to transmit, using the network interface module 1206, the educational content to the user. Consequently, the educational content may be presented to the user on the user device.

Furthermore, the processor 1202 may also be configured to transmit, using the network interface module 1206, the source code retrieved from the database. As a result, in various embodiments, the user device may be enabled to receive one or more of the source code and the educational content from the system 1200, such as a server computer, over a network such as the internet.

Figure 13:
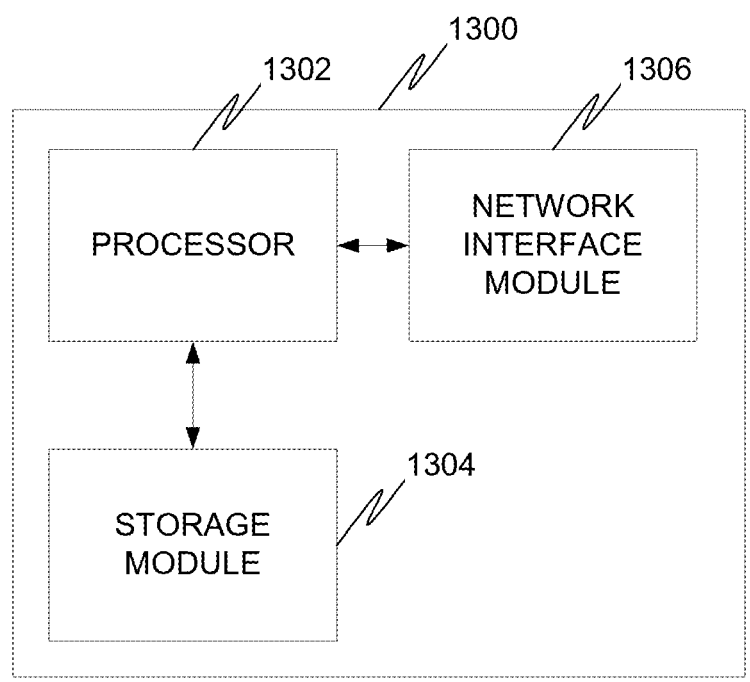
FIG. 13 illustrates a system for facilitating learning of a programming language according to various embodiments.

FIG. 13 illustrates a system for facilitating learning of the programming language according to various embodiments. The system may include each of a processor 1302, a storage module 1304 and a network interface module 1306. Further, the processor 1302 may be configured to present, using the network interface module 1306, the prompt to the user. Additionally, the processor 1302 may be configured to receive, using the network interface module 1306, the input representing the program behavior. Furthermore, the processor 1302 may be configured to generate the source code based on the input. Further, execution of the source code may correspond to the program behavior.

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

The invention claimed is:

1. A method of facilitating learning of a programming language, the method comprising:
 presenting, with a processor, a prompt to a user, the prompt comprising a question;
 receiving, with a processor, an input representing a program behavior, the input comprising an answer to the question;
 based on the answer, terminating or presenting, with a processor, a further prompt to the user, the further prompt comprising a further question;
 in response to terminating the further prompt, generating, with a processor, a source code based on the input, execution of the source code corresponding to the program behavior;
 in response to presenting the further prompt, receiving, with a processor, a further input representing a further program behavior, the further input comprising a further answer to the further question, the question, the answer, the further question and the further answer being classified into a hierarchical level;
 in response to receiving the further answer, generating, with a processor, a source code based on the further input, execution of the source code corresponding to the further program behavior;

presenting, with a processor, the source code to the user;
receiving, with a processor, a selection of the portion of the source code;
the answer representing one of confirmation and negation;
the program behavior comprising at least one of input behavior, output behavior and processing behavior;
the output behavior comprising presenting, with a processor, information to the user;
the prompt comprising a first prompt and a second prompt;
the input comprising a first input corresponding to the first prompt and a second input corresponding to the second prompt;
the first prompt being presented prior to the second prompt;
generating the second prompt based on the first input;
analyzing, with a processor, the input;
identifying the program behavior based on the analysis;
generating the source code comprising retrieving the source code from a source code repository based on the program behavior identified;
the generating comprising identifying the source code corresponding to the program behavior from a source code repository comprising source code corresponding to at least one program behavior;
the prompt corresponding to a confirmation for terminating presentation of a further prompt to the user;
receiving an input representing one of confirmation and negation;
presenting the prompt comprising displaying a plurality of graphical elements corresponding to a plurality of program functionalities;
executing, with a processor, the source code;
receiving, with a processor, an observation input representing a program behavior of the executed source code;
presenting the prompt being further based on the observation input;
receiving, with a processor, a user-source-code from a user;
analyzing, with a processor, the user-source-code;
identifying, with a processor, at least one of a syntactical error and a logical error based on analyzing the user-source-code;
presenting, with a processor, at least one of the syntactical error and the logical error;
identifying, with a processor, at least a portion of the user-source-code corresponding to at least one of the syntactical error and the logical error;
presenting, with a processor, an educational content corresponding to at least one of the syntactical error and the logical error, the educational content being an explanation of logic embodied in or a description of programming constructs used in the portion of the user-source-code or another portion of the user-source-code surrounding the portion of the user-source-code, the education content being in the form of a video, an audio or a multimedia; and
replacing, with a processor, the portion of the user-source-code with a validated portion of source code from a source code repository.

2. A system for facilitating learning of a programming language, the system comprising:
a processor;
the processor being configured to:
presenting a prompt to a user, the prompt comprising a question;
receiving an input representing a program behavior, the input comprising an answer to the question;
based on the answer, terminating or presenting a further prompt to the user, the further prompt comprising a further question;
in response to terminating the further prompt, generating a source code based on the input, execution of the source code corresponding to the program behavior;
in response to presenting the further prompt, receiving a further input representing a further program behavior, the further input comprising a further answer to the further question, the question, the answer, the further question and the further answer being classified into a hierarchical level;
in response to receiving the further answer, generating a source code based on the further input, execution of the source code corresponding to the further program behavior;
presenting the source code to the user;
receiving a selection of the portion of the source code;
the answer representing one of confirmation and negation;
the program behavior comprising at least one of input behavior, output behavior and processing behavior;
the output behavior comprising presenting information to the user;
the prompt comprising a first prompt and a second prompt;
the input comprising a first input corresponding to the first prompt and a second input corresponding to the second prompt;
the first prompt being presented prior to the second prompt;
the second prompt being generated based on the first input;
analyzing the input;
identifying the program behavior based on the analysis;
generating the source code comprising retrieving the source code from a source code repository based on the program behavior identified;
the generating comprising identifying the source code corresponding to the program behavior from a source code repository comprising source code corresponding to at least one program behavior;
the prompt corresponding to a confirmation for terminating presentation of a further prompt to the user;
an input representing one of confirmation and negation being received;
presenting the prompt comprising displaying a plurality of graphical elements corresponding to a plurality of program functionalities;
executing the source code;
receiving an observation input representing a program behavior of the executed source code;
presenting the prompt being further based on the observation input;
receiving a user-source-code from a user;
analyzing the user-source-code;
identifying at least one of a syntactical error and a logical error based on analyzing the user-source-code;
presenting at least one of the syntactical error and the logical error;
identifying at least a portion of the user-source-code corresponding to at least one of the syntactical error and the logical error;

presenting an educational content corresponding to at least one of the syntactical error and the logical error, the educational content being an explanation of logic embodied in or a description of programming constructs used in the portion of the user-source-code or another portion of the user-source-code surrounding the portion of the user-source-code, the education content being in the form of a video, an audio or a multimedia; and replacing the portion of the user-source-code with a validated portion of source code from a source code repository.

\* \* \* \* \*